United States Patent
Hensinger et al.

[19]

[11] Patent Number: 5,890,401
[45] Date of Patent: Apr. 6, 1999

[54] APPARATUS FOR THE CONTINUOUS PATH-CONTROLLED SHARPENING OF SAW TOOTHINGS

[75] Inventors: Bruno Hensinger, Laupeheim-Obersulmetingen; Peter Lenard, Biberach, both of Germany

[73] Assignee: Vollmer Werke Maschinenfabrik GmbH, Riss, Germany

[21] Appl. No.: 945,378

[22] PCT Filed: May 15, 1996

[86] PCT No.: PCT/EP96/02095

§ 371 Date: Sep. 29, 1997

§ 102(e) Date: Sep. 29, 1997

[87] PCT Pub. No.: WO96/37327

PCT Pub. Date: Nov. 28, 1996

[30] Foreign Application Priority Data

May 22, 1995 [DE] Germany ................. 195 18 710.5

[51] Int. Cl.$^6$ .................... B23D 63/12; B24B 53/12
[52] U.S. Cl. .................... 76/41; 76/43
[58] Field of Search ................. 76/37, 40, 43, 76/77, 112, 41; 451/5

[56] References Cited

U.S. PATENT DOCUMENTS

| | | | |
|---|---|---|---|
| 3,611,839 | 10/1971 | Idel et al. .............................. | 76/41 |
| 4,023,446 | 5/1977 | Annas et al. .......................... | 76/40 |
| 4,082,014 | 4/1978 | Idel ....................................... | 76/43 |
| 4,693,145 | 9/1987 | Gustavsson ........................... | 76/112 |
| 4,897,964 | 2/1990 | Vetter ..................................... | 451/5 |
| 5,117,713 | 6/1992 | Markusson ............................. | 76/40 |

FOREIGN PATENT DOCUMENTS

| | | |
|---|---|---|
| 2465547 | 3/1981 | France . |
| 2921196 | 12/1980 | Germany . |
| 3740199 | 6/1989 | Germany . |
| 9400697 | 8/1994 | Germany . |

*Primary Examiner*—Hwei-Siu Payer
*Attorney, Agent, or Firm*—Clifford W. Browning; Woodard, Emhardt, Naughton, Moriarty & McNett

[57] ABSTRACT

The apparatus comprises a saw blade holder (24), a grinding slide (30) which carries a profiled grinding wheel (38) and is movable to and fro in a strokewise manner with respect to the saw blade holder (24), and a feed slide (40). At the feed slide (40) a feed finger (48) can be moved from an inoperative position into a driving position in which it engages after a return motion of the feed slide (40) behind a tooth (12) of a saw blade (10) driving same during the next feed motion. The feed finger (48) can be rendered stationary in its inoperative position during dressing intervals. A dressing tool (50) is arranged at the feed slide (40) in such a manner that it can be moved in the dressing intervals from an inoperative position into a dressing position. The grinding slide (30) and the feed slide (40) are assigned a control system which can be switched from a grinding mode in which the motions of the two slides are coordinated corresponding to the profile of the saw toothing to a dressing mode in which the motions of the two slides are coordinated corresponding to the profile of the grinding wheel (38). This simplifies the dressing operation of the grinding wheel (38) and shortens the time required for each dressing operation.

6 Claims, 2 Drawing Sheets

APPARATUS FOR THE CONTINUOUS PATH-CONTROLLED SHARPENING OF SAW TOOTHINGS

The invention relates to an apparatus according to the preamble of claim 1.

In such apparatuses the grinding slide on the one hand and the feed slide on the other hand are controlled by a CNC control or a cam control system in such a manner that the grinding wheel plunges along a tooth face each into a tooth gap of the toothing of a saw blade while the feed slide remains stationary. As soon as the grinding wheel has reached the bottom of the tooth, a feed motion of the saw blade commences which is initiated by a driver in the form of a finger or a latch, which is supported at the feed slide, acting on a neighbouring tooth face. During the feed motion the grinding wheel generally plunges still deeper into the bottom of the tooth, and is then gradually retracted in order to sharpen the adjacent tooth back and finally its uppermost part which belongs to the tooth tip, the so-called flank. For this type of continuous path-controlled sharpening of saw toothings a grinding wheel is required which at its periphery comprises a profile which is adapted in a certain manner to the toothing profile.

Due to wear, the grinding wheel periphery gradually assumes a deviating profile; it is therefore necessary to dress the grinding wheel from time to time. For this purpose, the use of dressing diamonds is known which act on the grinding wheel in a spot-type manner and which can be moved under continuous path control in an own coordinate system, which is independent of the grinding device. Diamond dressing rolls are also known with a profile which complements the intended peripheral profile of the grinding wheel and which are also supported in an own device to be adjustable in at least two coordinates so that they can be brought into engagement with the grinding wheel which is only rotating while the grinding slide is stationary.

The invention is based on the object to simplify the dressing of grinding wheels in an apparatus for the continuous path-controlled sharpening of saw toothings and to shorten the required time for each dressing operation.

The object is solved according to the invention by the characteristics of claim 1. Advantageous further developments are the subject matter of the dependent claims.

The dressing tool according to the invention which preferably is a circular small plate consisting, at least partially, of polycrystalline diamond, requires little space and can therefore be located at the feed slide in the immediate vicinity of the saw blade in a space-saving manner in an inoperative position where the dressing tool does not interfere with the sharpening of saw toothings. In the sharpening intervals the dressing tool has therefore to cover only a small travel from its inoperative position into its dressing position in order to provide the conditions for the grinding wheel to now cooperate with the dressing tool instead of the saw toothing, by means of which it will be dressed in a single working stroke of the grinding slide and the feed slide. The dressing operation by means of the dressing tool differs from the normal operation during sharpening of saw toothings merely in that the feed finger is rendered stationary in its inoperative position during the dressing intervals, the dressing tool at the feed slide is moved into its dressing position and the motions of the grinding slide and the feed slide are adapted to the desired profile of the grinding wheel by switching the control system to the dressing mode. Compared to the normal equipment of a saw blade sharpening machine, an additional, controlled axis is not required for the dressing of the grinding wheel.

An embodiment of the invention will be described in the following with reference to schematic drawings with further details. In the drawings.

Figure 1:
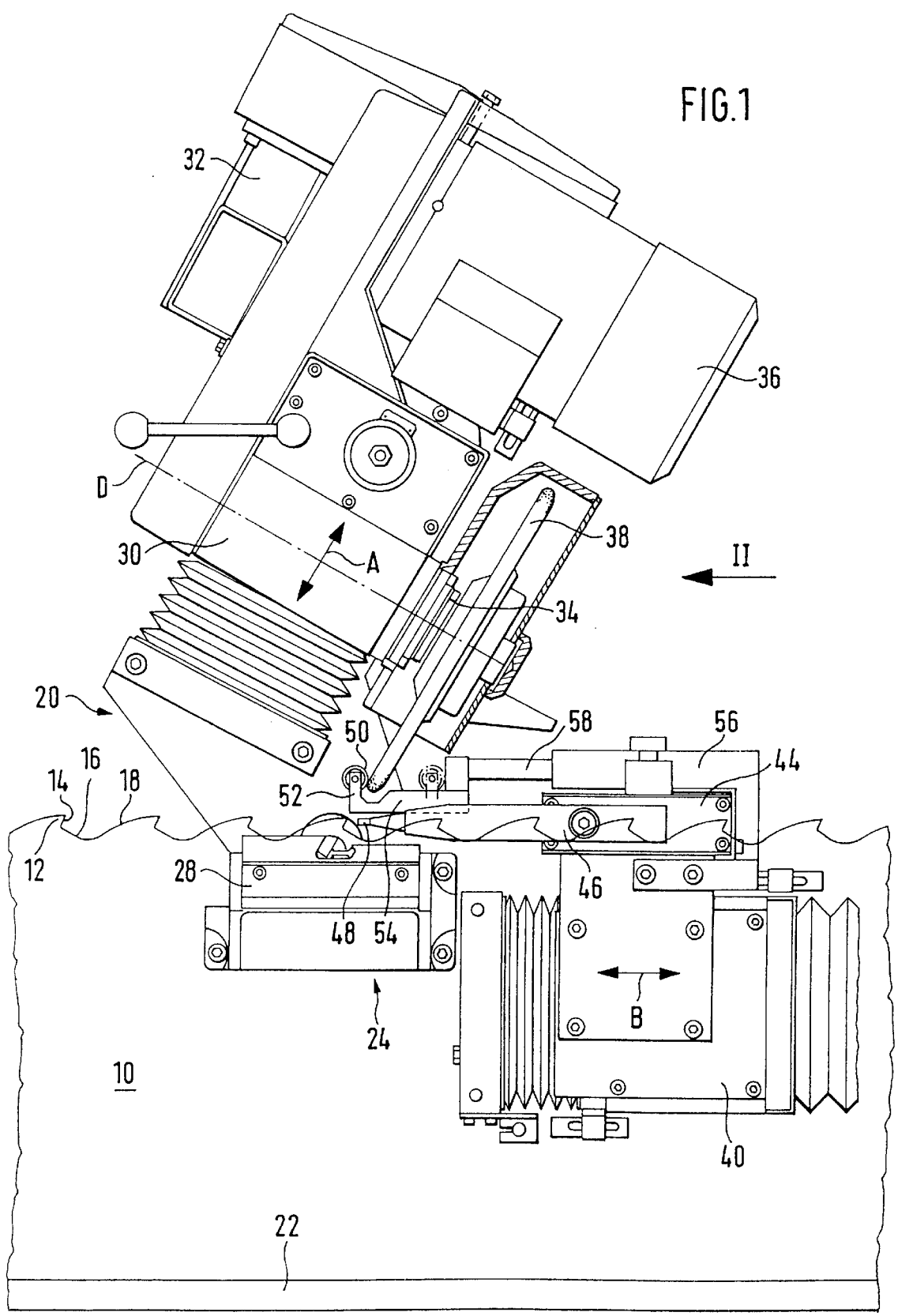
FIG. 1 shows the front view of an apparatus according to the invention.
Figure 2:
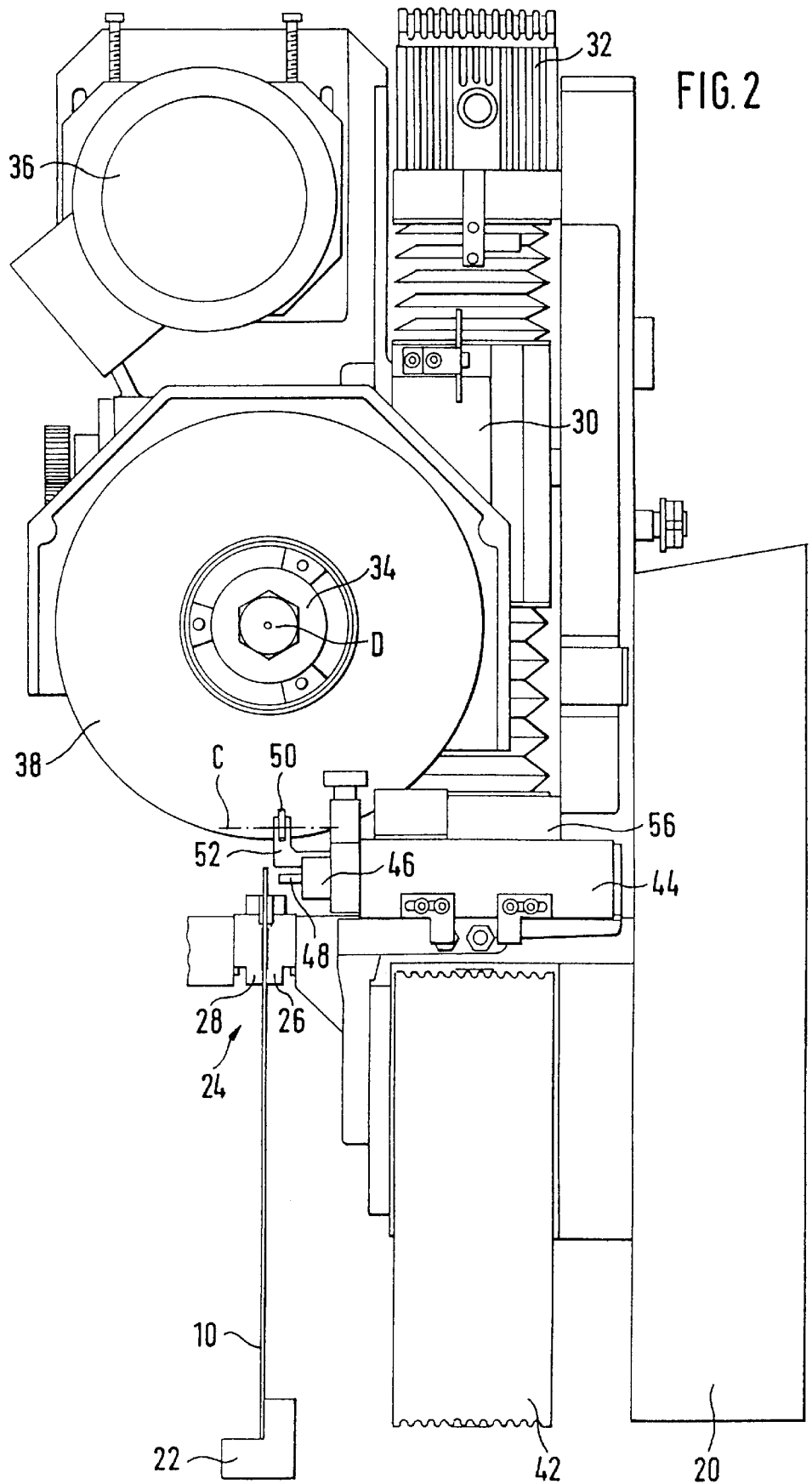
FIG. 2 shows the side view in the direction of the arrow II in FIG. 1.

In the drawings, a band saw blade is illustrated as an example of a saw blade 10 the toothing of which is to be sharpened; in the present context, however, the term saw blade covers a mill saw blade or a circular saw blade as well. In each case, a saw blade 10 with teeth 12 is involved, which are machined in a continuous path-controlled sharpening operation at their tooth faces 14 and additionally at their tooth bottoms 16 and tooth backs 18.

The apparatus for the sharpening of the saw blade 10 has a machine frame 20 with a saw blade guide 22 which in the illustrated example is formed by a horizontal rail and adjustable in height corresponding to the width of the saw blade 10. Above the saw blade guide 22 a saw blade holder 24 is arranged which in the illustrated example has a stationary jaw 26 and an adjustable jaw 28. The adjustable jaw 28 is biased in the usual manner in the direction of the stationary jaw 26 so that the saw blade 10 is held between the jaws in a vibration-free manner without being impeded in a feed motion.

At the machine frame 20 a grinding slide 30 can be moved upwards and downwards under an adjustable angle relative to the saw blade guide 22 in the direction of the double arrow A by means of a stroke drive 32. At the grinding slide 30 a grinding spindle 34 is supported which can be driven rotatably by means of a motor 36 and which carries a grinding wheel 38.

Furthermore, at the machine frame 20 a feed slide 40 is movable to and fro in parallel to the saw blade guide 22 in the sense of the double arrow B by means of a feed drive 42. The feed slide 40 carries a cross slide 44 which is movable normally to the plane of the saw blade 10, at which cross slide a feed arm 46 is arranged in parallel to the plane of the saw blade 10. The feed arm 46 comprises at its front end a feed finger 48 which extends normally to the plane of the saw blade 10 and is adjustable in such a manner that the feed finger 48 can be brought into contact with the tooth face 14 of a tooth 12 with each working stroke in order to push the saw blade 10 depending on the setting of the feed drive 42 by one or several tooth spacings in a forward direction. The cross slide 44 is retractable from its illustrated operative position into an inoperative position in which the feed finger 48 does not reach the plane of the saw blade 10; in this inoperative position the feed slide 42 is movable to and fro in the sense of the double arrow B without the saw blade 10 being advanced.

For the purpose of dressing of the grinding wheel 38 a disc-shaped dressing tool 50 is provided which is either a small plate which consists entirely of polycrystalline diamond (PCD) or a small compound plate where one or several PCD plates are soldered or glued onto a hard metal plate which in turn can be reinforced by a small steel plate. The dressing tool 50 has a circular outer periphery and a central hole by means of which it is replaceably clamped at a tool holder 52. In the illustrated example, this has a fork-shaped configuration and has a central pivot which engages the central hole of the dressing tool. The tool holder 52 thus accommodates the dressing tool 50 so as to be rotatably adjustable about an axis C normally to the plane of the saw blade 10 and to the feed direction (arrow B) so that it can be rotated, e.g. through 180°, reclamped and used further when is worn on one side.

The tool holder 52 is attached at a tool slide 54 in such a manner that the dressing tool 50 is arranged in close vicinity to the plane of the saw blade 10 within a plane which extends in parallel therewith. From the illustrated dressing position which is defined by an adjustable stop the tool slide 54 together with the dressing tool 50 can be retracted by means of a piston/cylinder unit 56 in parallel to the feed direction B into an inoperative position in which the dressing tool 50 can be contacted by neither the grinding wheel 38 nor the feed finger 48. The piston/cylinder unit 56 is attached at the feed slide 40, and its piston rod 58 is attached at the tool holder 52.

The motions of the grinding slide 30 and the feed slide 40 are controlled by a control system known per se, which can be an electronic CNC control, cam control system or the like. Grinding is performed according to a grinding mode in which the mentioned motions are coordinated with each other in the usual manner according to the shape of the toothing.

For the purpose of dressing of the grinding wheel 38 the control system is switched to a dressing mode, the cross slide 44 is moved into its inoperative position and retained therein so that the feed finger 48 cannot engage the toothing of the saw blade 10, and then the dressing tool 50 is advanced into its dressing position. All of this is effected immediately after a normal return stroke of the grinding slide 30. The next downward stroke of the grinding slide 30 and the forward motion of the feed slide 40 coordinated therewith are modified either CNC-controlled or by changing a cam drive which normally drives the two slides in such a manner that the grinding wheel 38 does not plunge into the saw blade but only cooperates with the dressing tool 50 whose dressing position is slightly higher than the toothing of the saw blade 10. These coordinated motions determine the shape which is imparted to the periphery of the grinding wheel 38 which will be dressed.

Subsequently, in the next upward stroke the control system is switched again to the original grinding mode in which the stroke drive 32 and the feed drive 42 are again coordinated with each other corresponding to the toothing profile. Thereby, the amount, however, by which the radius of the grinding wheel 38 was reduced in the dressing operation is compensated by shifting of the lower end of the travel distance of the grinding slide 30. At the same time, the dressing tool 50 is retracted into its inoperative position. The next cycle can already be a normal sharpening cycle during which the sharpening of the saw blade 10 is continued.

We claim:

1. An apparatus for the continuous path-controlled sharpening of saw toothings, comprising a saw blade holder (24), a grinding slide (30) which carries a profiled grinding wheel (38) and is movable to and fro in a strokewise manner with respect to the saw blade holder (24), and a feed slide (40) at which a feed finger (48) can be moved from an inoperative position into a driving position in which it engages after a return motion of the feed slide (40) behind a tooth (12) of a saw blade (10) driving same during the next feed motion, characterized in that the feed finger (48) is adapted to be rendered stationary in its inoperative position during dressing intervals, a dressing tool (50) is arranged at the feed slide (40) in such a manner that it can be moved in the dressing intervals from an inoperative position into a dressing position, and the grinding slide (30) and the feed slide (40) are assigned a control system which is adapted to be switched from a grinding mode in which the motions of the two slides are coordinated corresponding to the profile of the saw toothing to a dressing mode in which the motions of the two slides are coordinated corresponding to the profile of the grinding wheel (38).

2. The apparatus according to claim 1, characterized in that the dressing tool (50) in its dressing position is arranged approximately in the plane of the saw blade (10).

3. The apparatus according to claim 1 or 2, characterized in that the dressing tool (50) is guided at the feed slide (40) so as to be movable from its inoperative position into its dressing position in a direction parallel to the saw blade (10).

4. The apparatus according to claim 3, characterized in that the dressing tool (50) is replaceably attached at a tool holder.

5. The apparatus according to claim 4, characterized in that the dressing tool (50) is adapted to be clamped in several positions at the tool holder (52) and thus to be capable of being used further in a changed position after part of its periphery is worn.

6. The apparatus according to claim 4, characterized in that the dressing tool (50) is a disc which at least partially consists of polycrystalline diamond.

* * * * *